United States Patent
Engelke et al.

(10) Patent No.: US 12,077,709 B2
(45) Date of Patent: Sep. 3, 2024

(54) CEMENT SLURRY COMPOSITIONS COMPRISING POZZOLANIC CEMENT ADDITIVES AND METHODS FOR IMPROVING DEVELOPMENT OF COMPRESSIVE STRENGTHS IN THE CEMENT SLURRY COMPOSITIONS

(71) Applicant: Schlumberger Technology Corporation, Sugar Land, TX (US)

(72) Inventors: Bernardo Engelke, Houston, TX (US); Lynn Foster, Pearland, TX (US); Valerie Lafitte, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/073,650

(22) Filed: Dec. 2, 2022

(65) Prior Publication Data
US 2024/0182774 A1   Jun. 6, 2024

(51) Int. Cl.
*C09K 8/467* (2006.01)
*C04B 14/04* (2006.01)
(Continued)

(52) U.S. Cl.
CPC ............ *C09K 8/467* (2013.01); *C04B 14/045* (2013.01); *C04B 14/047* (2013.01);
(Continued)

(58) Field of Classification Search
CPC ..... C09K 8/467; C04B 14/045; C04B 14/047; C04B 14/104; C04B 14/106; C04B 14/22;
(Continued)

(56) References Cited

U.S. PATENT DOCUMENTS 4,590,227 A   5/1986  Nakamura
5,736,594 A   4/1998  Boles
(Continued)

FOREIGN PATENT DOCUMENTS

CN   108026338 A   5/2018
JP   2006118130 A   5/2006
(Continued)

OTHER PUBLICATIONS

Search Report and Written Opinion of International Patent Application No. PCT/US2023/022723 dated Sep. 8, 2023, 9 pages.
(Continued)

*Primary Examiner* — Crystal J Lee
(74) *Attorney, Agent, or Firm* — Jeffrey D. Frantz

(57) ABSTRACT

Pumpable slurry compositions comprising at least one aluminosilicate additive and optional pozzolanic cement additives and methods for improving development of compressive strengths in the pumpable cement slurry compositions are disclosed herein. The methods utilize one or more pumpable cement slurry compositions comprising at least one cement component, water, at least one first aluminosilicate additive, at least one optional second aluminosilicate additive, and one or more optional pozzolanic additives, wherein the at least one first aluminosilicate additive has an amorphous phase of greater than about 50% and a weight ratio of silica oxide to aluminum oxide of about 1.0 to about 2.5, and the at least one optional second aluminosilicate additive has a weight ratio of silica oxide to aluminum oxide of about 1.7 to about 3.3.

15 Claims, 5 Drawing Sheets

(51) Int. Cl.

| | | |
|---|---|---|
| *C04B 14/10* | (2006.01) | |
| *C04B 14/22* | (2006.01) | |
| *C04B 18/08* | (2006.01) | |
| *C04B 18/14* | (2006.01) | |
| *C04B 18/24* | (2006.01) | |
| *C04B 28/04* | (2006.01) | |
| *C04B 111/00* | (2006.01) | |
| *E21B 33/14* | (2006.01) | |

(52) U.S. Cl.
CPC .......... *C04B 14/104* (2013.01); *C04B 14/106* (2013.01); *C04B 14/22* (2013.01); *C04B 18/08* (2013.01); *C04B 18/141* (2013.01); *C04B 18/248* (2013.01); *C04B 28/04* (2013.01); *E21B 33/14* (2013.01); *C04B 2111/00146* (2013.01); *C04B 2201/20* (2013.01); *C04B 2201/50* (2013.01)

(58) Field of Classification Search
CPC ..... C04B 18/08; C04B 18/141; C04B 18/248; C04B 28/04; C04B 2111/00146; C04B 2201/20; C04B 2201/50; E21B 33/14
See application file for complete search history.

(56) References Cited

U.S. PATENT DOCUMENTS

| | | |
|---|---|---|
| 6,907,929 B2 | 6/2005 | Leroy-Delage |
| 7,138,446 B2 | 11/2006 | Reddy |
| 7,402,204 B2 | 7/2008 | Le Roy-Delage |
| 7,612,817 B2 | 11/2009 | Tay |
| 7,645,817 B2 | 1/2010 | Reddy |
| 7,717,180 B2 | 5/2010 | Badalamenti |
| 8,486,868 B2 | 7/2013 | Brenneis |
| 8,551,244 B2 | 10/2013 | Le Roy-Delage et al. |
| 9,222,011 B2 | 12/2015 | Le Roy-Delage et al. |
| 9,683,161 B2 | 6/2017 | Le Roy-Delage et al. |
| 10,557,341 B2 | 2/2020 | Kolchanov |
| 11,267,760 B2 | 3/2022 | Lehmann |
| 2002/0017224 A1* | 2/2002 | Horton .................. C04B 28/021 106/710 |
| 2005/0058817 A1* | 3/2005 | Famy ........................ E04C 2/06 428/292.1 |
| 2006/0174802 A1 | 8/2006 | Bedel et al. |
| 2006/0258546 A1 | 11/2006 | Brannon |
| 2012/0024196 A1* | 2/2012 | Gong ...................... C04B 7/243 404/72 |
| 2012/0152153 A1* | 6/2012 | Gong .................... C04B 28/006 106/816 |
| 2012/0175134 A1 | 7/2012 | Robisson |
| 2016/0032169 A1 | 2/2016 | Chew et al. |
| 2016/0244655 A1 | 8/2016 | Reddy |
| 2016/0289531 A1* | 10/2016 | Agapiou .................. C09K 8/44 |
| 2017/0334779 A1* | 11/2017 | Gong ....................... C09K 8/42 |
| 2018/0148628 A1* | 5/2018 | Vlasopoulos ......... C04B 14/106 |
| 2018/0230358 A1 | 8/2018 | Jain |
| 2018/0244572 A1* | 8/2018 | Ranjbar ............... C04B 41/0081 |
| 2020/0010363 A1 | 1/2020 | Thomas et al. |
| 2020/0247717 A1 | 8/2020 | Atakan et al. |
| 2022/0340488 A1 | 10/2022 | Bullerjahn et al. |
| 2023/0126439 A1 | 4/2023 | Pisklak |
| 2023/0138857 A1 | 5/2023 | Singh |
| 2023/0374366 A1 | 11/2023 | Lafitte |

FOREIGN PATENT DOCUMENTS

| | | |
|---|---|---|
| WO | 2005040550 A1 | 5/2005 |
| WO | 2017087163 A1 | 5/2017 |
| WO | 2022122848 A1 | 6/2022 |

OTHER PUBLICATIONS

Search Report and Written Opinion of International Patent Application No. PCT/US2023/023080 dated Sep. 8, 2023, 10 pages.
Search Report and Written Opinion of International Patent Application No. PCT/US2023/036121 dated Feb. 23, 2024, 9 pages.

* cited by examiner

CEMENT SLURRY COMPOSITIONS COMPRISING POZZOLANIC CEMENT ADDITIVES AND METHODS FOR IMPROVING DEVELOPMENT OF COMPRESSIVE STRENGTHS IN THE CEMENT SLURRY COMPOSITIONS

FIELD OF THE DISCLOSURE

The disclosure generally relates to one or more pozzolanic cement additives, cement slurry compositions comprising the one or more pozzolanic cement additives, and methods for improving development of compressive strengths in the cement slurry compositions. The one or more pozzolanic cement additives may be compressive strength boosters for cement systems and/or compositions having a lower or very low solid volume fraction, such as, for example, less than about 40%. As a result of adding the one or more pozzolanic cement additives to the cement systems and/or compositions, the resulting cement systems and/or compositions achieve and/or exhibit improved or substantially improved compressive strengths. In general and throughout the present disclosure, the terms "pozzolan" and "pozzolanic" may be used interchangeably and may refer to at least one siliceous or siliceous and aluminous material that possesses little or no cementitious value. In a finely divided form and in the presence of moisture; however, the pozzolan or pozzolanic material may react chemically with calcium hydroxide to form one or more compounds possessing one or more cementitious properties. In general and throughout the patent disclosure, the term "aluminosilicate" refers to one or more minerals composed of aluminium, silicon, and oxygen along with one or more countercations and may be at least one major component of kaolin and other clay minerals. Moreover, the term "aluminosilicate" may generally refer to at least one silicate in which aluminum replaces some of the silicon, such as, for example, a rock-forming mineral, a feldspar and/or a clay mineral.

BACKGROUND

The statements in this section merely provide background information related to the present disclosure and do not constitute prior art.

Traditionally, petroleum/oil industry and/or market is substantially cost driven throughout the geographical regions of the world and identifying cost effective solutions that achieve technical requirements has been challenging for participants of the industry and/or market. For example, during cementing intermediate jobs, it is common to pump a known 11.0-11.5 pounds per gallon (hereinafter "ppg") 50/50 Class C/Fly-Ash cement system as a lead slurry in one or more geographical regions. However, the cost of this known cement system is very low, but properties of the resulting/set cement produced with this known cement system are significantly poor. In many instances, the compressive strength (hereinafter "CS") of the resulting/set cement is unacceptable for such cementing jobs.

Currently, there are several known methods and/or additives to improve development of the CS of cement (hereinafter referred to as "CS development" or "CSD"). However, these known methods are typically expensive, and most of the known additives that are utilizable to improve the CS of cement also affect the parameters associated with its applications, such as, for example, increasing the pumping time, reducing the thickening time, or a combination thereof. Even when the thickening time is adjusted with other additives such as retarders, the improvement observed in CS is typically negated in most of the instances.

Additionally, the known methods that may improve CSD of cement can also increase the solid volume fraction (hereinafter "SVF"), which is typically overcome by adding lightweight particles, such as, for example, glass bubbles, or the like. In other words, known and/or conventional cement systems (i.e., without glass bubbles) at lower SVFs cannot provide ideal or acceptable compressive strengths. As a result, the cement blend may have more cementitious material and, therefore, higher CS. There are known commercial cement blends that exhibit these CS and SVF characteristics. Foam cement is another known method, which involves operational complexity and increase in cost.

Some known additives that directly improve CSD are accelerators, pozzolanic material and silica, but thickening time of the resulting cement is also affected by these known additives. Similarly, at higher concentrations of metakaolin, an effect on the thickening time of the resulting cement is observed as well.

So this new invention does limit the amount of metakaolin added to a cement system so as to provide the CS boost without affecting thickening time.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, one or more pumpable cement slurry composition are provided and may comprise at least one cement component comprising cement particles, water, a first aluminosilicate additive comprises an amorphous phase, an optional second aluminosilicate additive, and an optional pozzolanic additive. The first aluminosilicate additive may be present at a concentration of up to about 30% by weight of the at least one cement component and/or may comprise a weight ratio of silica to aluminum oxide (Si/Al weight ratio) of about 1.0 to about 2.5 and an amorphous phase of greater than about 50%.

In an embodiment, the first aluminosilicate additive may comprise at least one pozzolanic additive selected from D-Dust, glass powder pozzolan, zeolite, fly ash, rice husk ash, micro-slag, metakaolin, and calcinated clay.

In an embodiment, the option second aluminosilicate additive may be present in the pumpable cement slurry composition and/or may be at least one selected from D-Dust, glass powder pozzolan, zeolite, fly-ash, micro-slag, metakaolin, calcinated clay, diatomaceous earth, pumice, biomass ashes, ground granulated blast furnace slag, and a combination thereof.

In an embodiment, the optional second aluminosilicate additive may be present at a concentration of up to about 190% by weight of the at least one cement component.

In an embodiment, the optional second aluminosilicate additive may comprise a weight ratio of silica to aluminum oxide of about 1.7 to about 3.3.

In an embodiment, the amorphous phase of the first aluminosilicate additive may be greater than or equal to about 90% and/or the weight ratio of silica to aluminum oxide of the first aluminosilicate additive may be about 1.1 to about 2.3.

In an embodiment, the at least one cement component may be Portland cement or ordinary Portland cement, construction cement, or a combination thereof.

In an embodiment, the first aluminosilicate additive may comprise calcinated clay.

In an embodiment, the optional second aluminosilicate additive may be present in the pumpable cement slurry composition and/or may comprise fly-ash.

In an embodiment, the first aluminosilicate additive may be calcinated clay, the optional second aluminosilicate additive may be present and may comprise fly-ash, and the optional pozzolanic additive may be present and may selected from the group consisting of D-Dust, glass powder pozzolan, zeolite, rice husk ash, micro-slag, metakaolin, high-reactivity metakaolin, calcinated clay, diatomaceous earth, pumice, biomass ashes, ground granulated blast furnace slag, and at least one combination thereof.

In an embodiment, the optional pozzolanic additive may be present and/or may have a weight ratio of silica to aluminum oxide of greater than about 4 or may be selected from the group consisting of rice husk ash, silica fume, and a combination thereof.

In an embodiment, particle sizes of the first aluminosilicate may be less than particle sizes of the cement particles.

In an embodiment, a density of the pumpable cement slurry composition may be less than or equal to about 14.5 ppg or about 15 ppg and/or a viscosity of the pumpable cement slurry composition may be less than about 400 cP.

In an embodiment, the density may be at least about 10 ppg and no more than about 11.5 ppg.

In an embodiment, a solid volume fraction of the pumpable cement slurry composition may be less than about 40%.

In an embodiment, methods for cementing subterranean wells comprising of boreholes are provided and may comprise preparing a pumpable cement slurry composition, pumping the pumpable cement slurry composition into the subterranean well such that the pumpable cement slurry composition is disposed at or in a zone of the subterranean well, and allowing the pumpable cement slurry composition to set and form a solid mass in the zone. The pumpable cement slurry may comprise a cement component, water present at a concentration of at least about 200% by weight of the cement component, a first aluminosilicate additive having an amorphous phase of greater than about 50% and a silica to aluminum ratio (Si/Al ratio) of about 1.0 to about 2.5, an optional second aluminosilicate additive, an optional pozzolanic additive, and at least one cement additive selected from one or more dispersants, at least one antifoam, one or more retarders, one or more accelerators, silica, or at least one combination thereof.

In an embodiment, the optional second aluminosilicate additive, when present in the pumpable cement slurry composition, may be selected from D-Dust, glass powder pozzolan, zeolite, fly-ash, rice husk ash, micro-slag, metakaolin, calcinated clay, or a combination thereof.

In an embodiment, the optional second aluminosilicate additive may be present at a concentration of up to 190% by weight of the cement component and/or may have a weight ratio of silica to aluminum oxide of about 1.7 to about 3.3.

In an embodiment, a density of the pumpable cement slurry composition may be less than or equal to about 15 ppg and/or a viscosity of the pumpable cement slurry composition may be less than about 400 cP.

In an embodiment, the density of the pumpable cement slurry may be at least about 10 ppg and no more than about 11.5 ppg and/or a solid volume fraction of the pumpable cement slurry composition may be less than about 40%.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
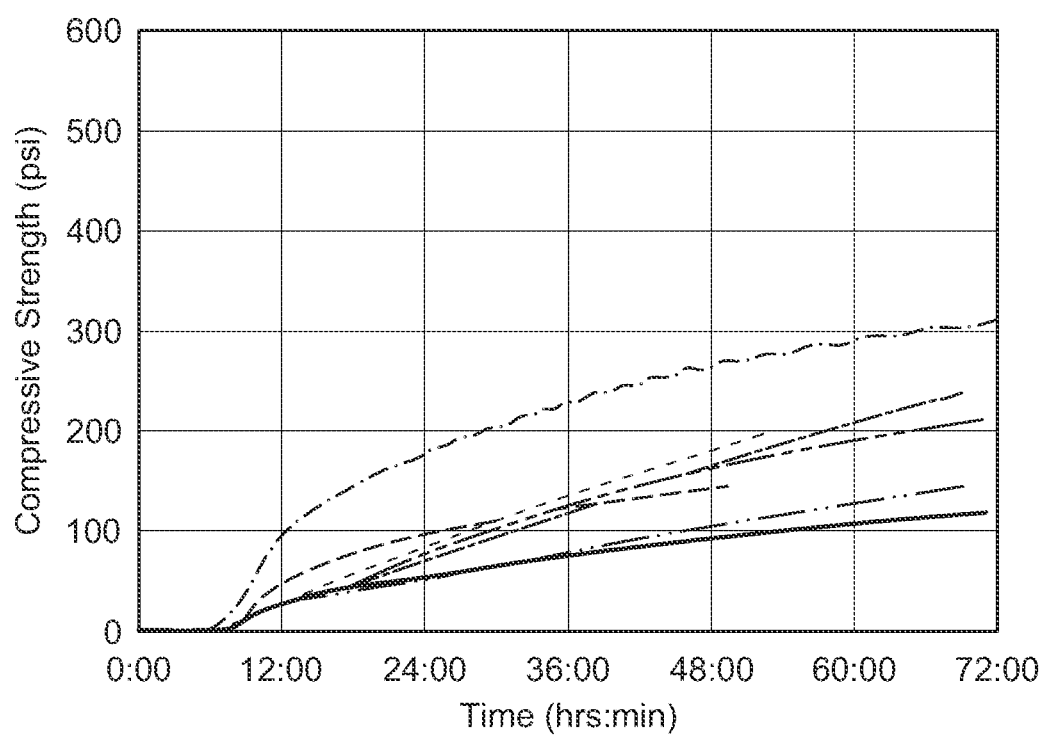
FIG. 1 is a graph showing CSD at a bottom hole static temperature (hereinafter "BHST") of 140° F. and a bottom hole pressure (hereinafter "BHP") of 6,000 pounds per square inch (hereinafter "psi") for cement slurry compositions, according to one or more examples of the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." As used herein, the phrases "selected from the group consisting of," "chosen from," and the like include mixtures of the specified compounds and/or materials. Terms, such as, for example, "contains" and the like are meant to include "including at least" unless otherwise specifically noted.

Herein, the term "about" when applied to a value generally means within the tolerance range of the equipment used to produce the value, or in some examples, means plus or minus 15%, plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Where a numerical limit or range is stated, the endpoints are included. Also, all values and subranges within a numerical limit or range are specifically included as if explicitly written out. Moreover, examples herein are intended to be illustrative only and are presented for discussion purposes and not by way of limitation.

Embodiments disclosed herein relate to one or more pozzolanic cement materials and/or additives (collectively referred to hereinafter as "the pozzolanic additive" or "the pozzolanic additives") that may be incorporated into one or more cement slurry compositions (hereinafter "the cement composition" or "the cement compositions") for use in or to be utilized during one or more cementing applications and/or operations of one or more subterranean wells having one or more wellbores or boreholes formed therein. The cement composition or compositions in accordance with the present disclosure may be formulated to include the pozzolanic additive or additives which promote or improve CSD in one or more low SVF cement compositions. In one or more embodiments, the pozzolanic additives disclosed herein may comprise at least one first aluminosilicate additive (hereinafter "the first aluminosilicate additive"), at least one optional second aluminosilicate additive (hereinafter "the optional second aluminosilicate additive"), at least one optional pozzolanic additive (hereinafter "the optional pozzolanic additive"), or at least one mixture or combination thereof.

In one or more embodiments, addition, inclusion, or incorporation of the pozzolanic additive or additives disclosed herein into the cement composition or compositions improve the CSD of the resulting cement composition or compositions while keeping or maintaining low or lower cost(s) for execution and/or completion of the one or more cementing applications and/or operations which may be performed, completed, and/or commenced at the one or more geographical locations. Furthermore, the resulting cement composition or compositions developed for the one or more geographical locations may also be applied to other and/or any geographical operations that may utilize light to low weight cement compositions or systems (hereinafter "the low weight cement system" or "the low weight cement systems"). In some embodiment, the low weight cement system may have a density range of at least about 10.5 ppg, at least about 11.0 ppg and/or up to about 11.5 ppg. In other embodiments, the pozzolanic additive or additives disclosed herein may be added to and/or included, incorporated, or mixed into the cement composition or compositions that may have a density of less than or equal to about 15 ppg, less than or equal to about 14 ppg, less than or equal to about 13 ppg, or less than or equal to about 12 ppg.

In the present disclosure, the CS of cement may refer to and/or may comprise one or more multiple areas with respect to CS. In some embodiments, the CS of cement disclosed herein may refer to, include, comprise, and/or consist of, but is not limited to, the 24-hour cube crush, the time needed to develop 50 psi compressive strength, the time needed to develop 500 psi compressive strength, the 24-hour compressive strength, the final compressive strength achieved by a set cement, or any combination thereof. In one or more embodiments, the CS improvement observed, exhibited, and/or achievable by the cement composition or compositions disclosed herein (i.e., comprising the pozzolanic additive or additives) may not be limited to a single curing temperature, a single curing pressure, or a combination thereof.

The cement composition or compositions disclosed herein comprise the first aluminosilicate additive, the optional second aluminosilicate additive, and/or the optional pozzolanic additive as a compressive strength booster(s) to produce a resulting cement composition or compositions or the low weight cement system or systems (i.e., cement system with a SVF of less than about 40%, less than about 35%, less than about 30%, less than about 25%, or less than about 20%). By adding the pozzolanic additive or additives disclosed herein, the CS of the resulting cement composition or compositions may achieve, exhibit, and/or provide significant or substantial unexpected and surprising CSD improvement(s). In some embodiments, the first aluminosilicate additive may have an amorphous phase of greater than about 50%, greater than or equal to about 75%, greater than or equal to about 90%, or greater than or equal to about 95%. The first aluminosilicate additive may have weight ratio of silica (i.e., $SiO_2$) to aluminum oxide(s) (i.e., $Al_2O_3$) (hereinafter "Si/Al weight ratio") of about 1.0 to about 2.5, about 1.1 to about 2.3, or about 1.2 to about 2.25. In at least one embodiment, the first aluminosilicate additive may be or may comprise metakaolin (i.e., calcined kaolin clay).

In some embodiments, the optional second aluminosilicate additive may be present in the cement composition or compositions and may have a Si/Al weight ratio of about 1.7 to about 3.3, about 1.8 to about 2.6, or about 2.0 to about 2.5. By adding at least the first aluminosilicate additive with or without the optional second aluminosilicate and/or the optional pozzolanic additive, the CS of the resulting cement composition or compositions may achieve, exhibit, and/or provide significant or substantial unexpected and surprising CSD improvement(s). Depending on the concentration or amount of the total aluminosilicate/pozzolanic additives included into the cement composition or compositions disclosed herein, the 24-hour CS and/or the 72-hour CS of the resulting cement composition or compositions may be substantially improved by at least about two times or a factor of about two, about three times or a factor of about three, or more when compared to cement compositions excluding the aluminosilicate/pozzolanic additives or the first aluminosilicate additive disclosed herein. In at least one embodiment, the resulting cement composition or compositions may achieve, exhibit, or provide a final or overall total strength of at least about 200 psi, at least about 250 psi, at least about 500 psi, at least about 750 psi, at least about 1,000 psi, at least about 1,250 psi, at least about 1,500 psi, at least about 1,750 psi, or equal to or less than about 2,000 psi.

In one or more embodiments, the cement composition or compositions disclosed herein may be one or more cement slurry compositions that may comprise, consist of, or essentially or substantially comprise or consist of a blend of at least one cement component, water or an aqueous based fluid, and the aluminosilicate/pozzolanic additives (i.e., the first aluminosilicate additive with or without the optional second aluminosilicate additive and/or the optional pozzolanic additive). In some embodiments, the at least one cement component may be, comprise, consist of, or essentially or substantially comprise or consist of a plurality of cement particles. In some embodiments, the particle size(s) of the aluminosilicate/pozzolanic additives (i.e., the first aluminosilicate additive with or without the optional second aluminosilicate additive and/or the optional pozzolanic additive) may be smaller or less than or substantially smaller or less than the particle size(s) of the cement particles. In some embodiments, the particles size(s) may range from about 0.25 microns to about 40 microns or from about 0.5 microns to about 30 microns. In at least one embodiment, the particle size(s) of at least 90% of the particles may be lower or less than about 30 microns in the dry method (laser diffraction). In some embodiments, the cement particles may be, comprise, or consist of, for example, Portland or ordinary Portland cement particles, construction cement particles, a combination thereof, or the like. In general, Portland cement particles are obtained by pulverizing clinker comprising or consisting of hydraulic calcium silicates, and portland cement is a traditional type of cement used or utilized for oil-well and/or gas-well cementing applications, jobs, and/or operations. Ordinary Portland cement which is grey may be the most common type of portland cement, but white portland cement is also available. White Portland cement is often similar to ordinary, grey, Portland cement in one or more respect, except for a higher degree of whiteness for white Portland cement when compared to ordinary, grey, Portland cement.

In some embodiments disclosed herein, the cement composition or compositions disclosed herein may comprise, consist of, or essentially or substantially comprise or consist of the at least one cement component, water, the aluminosilicate/pozzolanic additive(s) (i.e., the first aluminosilicate additive with or without the optional second aluminosilicate additive and/or the optional pozzolanic additive), or a combination thereof. In at least one embodiment, the at least one cement component may be present at a concentration of about 100% by weight of the cement (hereinafter "BWOC") or at a concentration range of about 25% to about 100% by weight of the blend (hereinafter "BWOB"), about 30% to about 100% BWOB, or about 35% to about 100% BWOB. In at least one embodiment, the aluminosilicate/pozzolanic additives may comprise fly-ash and metakaolin, wherein the fly-ash may be present at a concentration range of about 0% to about 175% BWOC, about 190% BWOC, or about 210% BWOC or a concentration range of about 0% to about 50% BWOB, about 65% BWOB, or about 75% BWOB. In some embodiments, the metakaolin may be present at a concentration range of up to about 20% BWOC, about 25% BWOC, about 30% BWOC, about 35% BWOC, or about 40% BWOC or up to about 10% BWOB, about 15% BWOB, about 20% BWOB, about 25% BWOB, or about 30% BWOB. Water may be present at a concentration of greater than about 70% BWOC, greater than about 80% BWOC, greater than about 90% BWOC, greater than about 100% BWOC, about 200% BWOC, about 300% BWOC, about 400% BWOC, or about 500% BWOC. The blend with respect to BWOB may include all of the above-mentioned components of the dry phase (i.e., the at least one cement component and the aluminosilicate/pozzolanic additive(s)).

In one or more embodiments, the first aluminosilicate additive with or without the optional second aluminosilicate additive and/or the optional pozzolanic additive disclosed herein may be, include, comprise, or consist of one or more of the pozzolanic additives selected from fly-ash, D-Dust, glass powder pozzolan, zeolite, rice husk ash, micro-slag, metakaolin, calcinated clay, at least one pozzolan material, or at least one combination thereof. In some embodiments, the first aluminosilicate additive, the optional second aluminosilicate additive, and/or the optional pozzolanic additive disclosed herein may be at least one selected from D-Dust, glass powder pozzolan, zeolite, rice husk ash, fly-ash, micro-slag, metakaolin, high-reactivity metakaolin, calcinated clay, diatomaceous earth, pumice, biomass ashes, ground granulated blast furnace slag (hereinafter "GGBS"), or at least one combination thereof. The second optional aluminosilicate additive may be or comprise fly-ash, rice husk ash or at least one of the above-mentioned one or more pozzolanic additives. In an embodiment, the at least one cement component may comprise the first aluminosilicate additive with or without the optional second aluminosilicate additive, the optional pozzolanic additive, fly-ash, metakaolin, or at least one combination thereof. In an example, the optional second aluminosilicate may be present and may comprise fly-ash which may be replaceable by another pozzolanic material selected from the above-mentioned one or more pozzolanic additives and/or metakaolin may be added as a CS booster. In other embodiments, the cement composition or compositions disclosed herein may exclude the optional second aluminosilicate additive or the option pozzolanic additive and may include or comprise only the first aluminosilicate additive. In another example, the blend may comprise cement particles, at least one zeolite, and metakaolin, which may be added to improve the CS development of the cement composition or compositions.

The cement composition or compositions disclosed herein may further include or comprise one or more optional cement additives (hereinafter "the optional cement additives"). The optional cement additives may be, comprise, or consist of one or more cement additives selected from one or more fluid-loss additives, one or more cement dispersants, one or more weighting agents, one or more lost circulation additives, one or more cement extenders, at least one cement antifoam, one or more cement retarders, one or more cement accelerators, silica, one or more viscosifiers, one or more swelling additives, one or more flexible additives, one or more foamers, one or more latex or latex-based additives, one or more fibers, one or more expanding additives, one or more surfactant additives, or a combination thereof. In embodiments, the optional cement additives may be included into the cement composition or compositions disclosed herein to control, change, or adjust one or more characteristics, properties, and/or features of the result cement composition or compositions. In at least one embodiment, the one or more characteristics, properties, and/or features may comprise density, setting time, strength, flow, fluid loss, rheology, expansion, one or more mechanical properties, self-healing, or a combination thereof, wherein the one or more mechanical properties may comprise at least one selected from CS, Young's modulus, Poisson ratio, tensile strength, or at least one combination thereof. In some embodiments, the optional cement additives may be present at a concentration range of at least about 0.01% BWOC, about 0.05% BWOC, or about 0.1% BWOC and no greater than about 25% BWOC, about 35% BWOC, or about 45% BWOC.

In one or more embodiments, the resulting cement composition or compositions or the cement slurry compositions disclosed herein may be or comprise one or more low density slurries that may be pumped or pumpable into the one or more subterranean wells wherein frac pressures of the one or more subterranean wells may be low, especially in subterranean wells with at least one circulating fluid issue. In an embodiment, the at least one circulating fluid issue may be, include, comprise, or consist of one or more equivalent circulating density (hereinafter "ECD") issues. In order to achieve good, desirable, and/or necessary set properties of the resulting cement, foam cement and glass bubbles with high SVF systems may be utilized and/or incorporated therein; however, foam cement and glass bubbles are typically an expensive solution. In some embodiments, the cement composition disclosed herein and comprising the first aluminosilicate additive, with or without the optional second aluminosilicate additive and/or the optional pozzolanic additive, may be a pumpable cement composition having a viscosity of less than about 400 centipoise (hereinafter "cP"), less than about 350 cP, or less than about 300 cP.

When cost limits the use of certain technologies (i.e., foam cement and glass bubbles), pumping lower density slurries (i.e., the cement composition or compositions or the cement slurry composition(s) disclosed herein) with low SVF (i.e., about <40%, about <35%, or about <25%) may provide a cost-efficient solution and/or may achieve the good, desirable, and/or necessary set properties of the resulting cement. However, other properties of set cement may be compromised. In some embodiments, the first aluminosilicate additive, the optional second aluminosilicate additive, the optional pozzolanic additive, fly-ash, metakaolin, and/or at least one supplementary cementing material may be added to the cement composition or compositions or the cement slurry composition(s) to increase SVF thereof, while keeping density low. However, the first aluminosilicate additive, the optional second aluminosilicate additive, the optional pozzolanic additive, the fly-ash, the metakaolin, and/or the at least one supplementary cementing material may not be effective or substantially to improve or may only partially improve the CSD of the resulting cement composition or compositions or the cement slurry composition(s).

In one or more embodiments, the first aluminosilicate additive, the optional second aluminosilicate additive, and/or the optional pozzolanic additive disclosed herein may be used, incorporated, and/or included into the cement composition or compositions to improve CSD of the resulting low-density cement compositions and/or resulting cement systems. In some embodiments, the first aluminosilicate additive, the optional second aluminosilicate additive, and/or the optional pozzolanic additive disclosed herein may be, include, comprise, or consist of zeolite, rice husk ash, glass powder pozzolans, alumina-silicates, micro-slag, or a combination thereof.

In some embodiments, the cement slurry blends disclosed herein may comprise the at least one cement component, water, the first aluminosilicate additive, the optional second aluminosilicate additive and the optional pozzolanic additive having a Si/Al weight ratio of greater than about 4, wherein the first and second aluminosilicate additives along the pozzolanic additive are utilized or used to improve CS development of the cement composition or compositions. In at least one embodiment, the at least one cement component comprises ordinary Portland cement, construction cement or a combination thereof, and the first aluminosilicate additive is at least one selected from D-Dust, glass powder pozzolan, zeolite, micro-slag, metakaolin, high-reactivity metakaolin, calcinated clay, diatomaceous earth, pumice, biomass ashes, ground granulated blast furnace slag, and a combination thereof. Further, the optional second aluminosilicate additive is at least one selected from D-Dust, glass powder pozzolan, zeolite, micro-slag, metakaolin, high-reactivity metakaolin, calcinated clay, diatomaceous earth, pumice, biomass ashes, ground granulated blast furnace slag, fly-ash, and a combination thereof. Moreover, the optional pozzolanic additive having the Si/Al weight ratio of greater than about 4 may be at least one selected from rice husk ash, silica fume, and a combination thereof.

In the following examples, a series of experiments were conducted to illustrate that the pozzolanic additive or additives disclosed herein is/are a very reactive pozzolanic material(s) having the characteristic of improving CSD of a low-density conventional cement system, such as, for example, the cement composition or compositions or the cement slurry composition(s) disclosed herein (collectively referred to hereinafter as "low-density conventional cement system").

Examples 1-5 disclosed herein show that metakaolin is a very reactive aluminosilicate and/or pozzolanic material that has the characteristic of improving CSD of the low-density conventional cement systems disclosed herein.

Example 1

FIG. 1 graphically illustrates the experimental results of Example 1. The bottom most line of the graph in FIG. 1 shows CSD at BHST (140° F.) and BHP (6,000 psi) of a 11.0 ppg 50/50 Class C/Fly-ash system containing the following additives: 0.02 gps of antifoam; 10% BWOB of bentonite; 0.50% BWOB of sodium silicate; and 0.50% BWOB of lignosulfonate-type retarder. This is the reference slurry without any additive to boost CS. It was mixed as per API 10B-2 and conditioned for 30 minutes at bottom hole circulatory temperature (hereinafter "BHCT") of 130° F.

The following aluminosilicate and/or pozzolanic materials were added to this reference slurry at the same concentration to boost CSD:
- the second bottom most line: Reference slurry+10% BWOB of D-Dust;
- the fifth bottom most line: Reference slurry+10% BWOB of glass powder pozzolan;
- the fourth bottom most line: Reference slurry+10% BWOB of zeolite;
- the sixth bottom most line: Reference slurry+10% BWOB of rice husk ash;
- the third bottom most line: Reference slurry+10% BWOB of micro-slag; and
- the top most line: Reference slurry+10% BWOB of metakaolin For such a slurry of Example 1, metakaolin has a performance much superior to any other aluminosilicate and/or pozzolanic material.

Example 2

Figure 2:
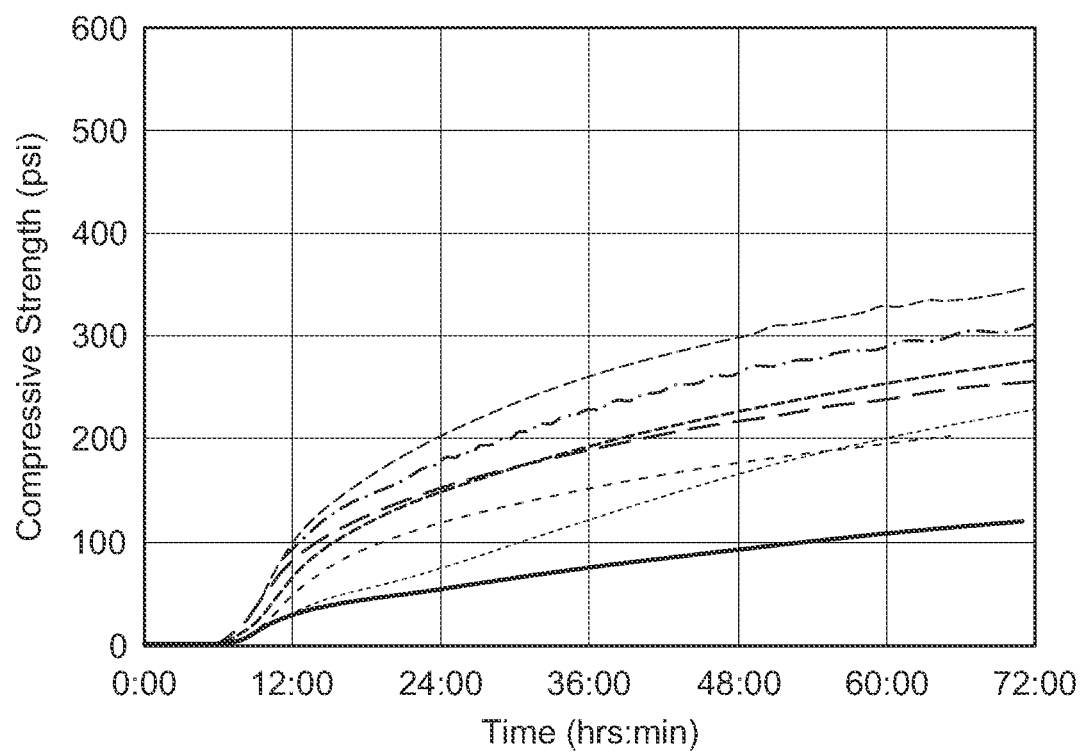
FIG. 2 is a graph showing CSD at a BHST of 140° F. and a BHP of 6,000 psi for cement slurry compositions, according to one or more examples of the present disclosure.

FIG. 2 graphically illustrates the experimental results of Example 2. The bottom most line of the graph in FIG. 2 shows CSD at BHST (140° F.) and BHP (6,000 psi) of a 11.0 ppg 50/50 Class C/Fly-ash system containing the following additives: 0.02 gps of antifoam; 10% BWOB of bentonite; 0.50% BWOB of sodium silicate; and 0.50% BWOB of lignosulfonate-type retarder. This is the reference slurry without any additive to boost CS. It was mixed as per API 10B-2 and conditioned for 30 minutes at BHCT (130° F.).

All the other curved lines show 11.0 ppg system with the addition of 10% BWOB of metakaolin. Different curved lines mean different grades or suppliers of the metakaolin. Most of the metakaolin based materials tested show a significant improvement, especially within the first 24 hours.

Example 3

Figure 3:
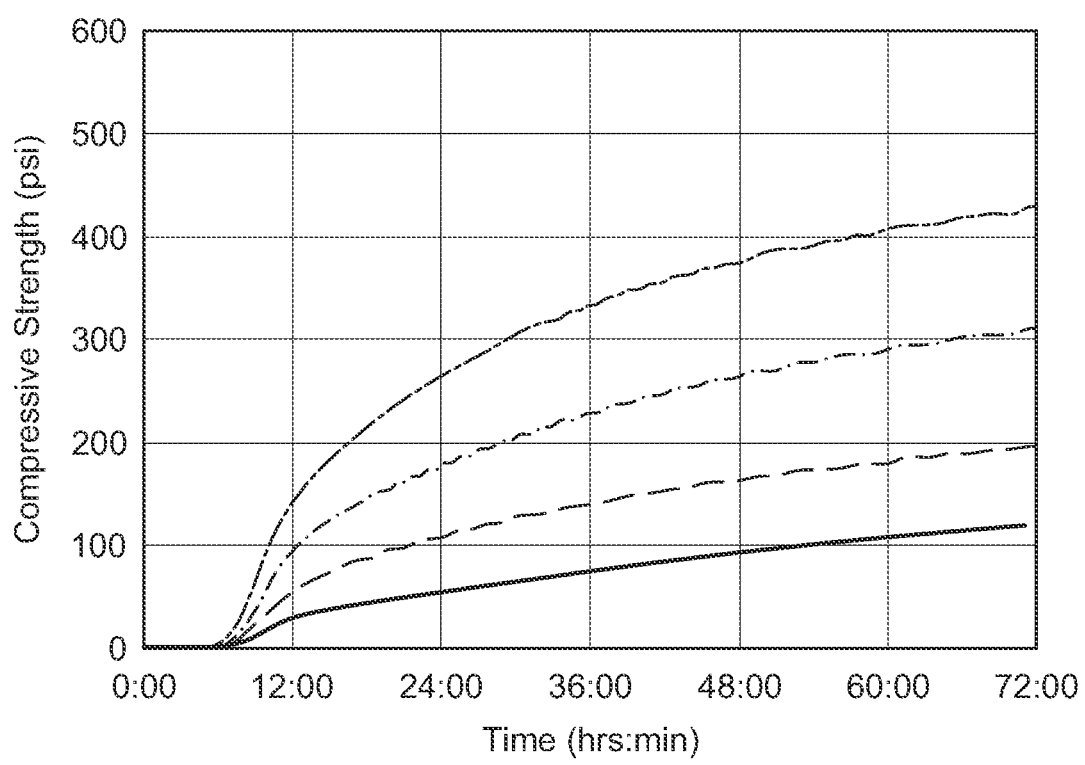
FIG. 3 is a graph showing CSD at a BHST of 140° F. and a BHP of 6,000 psi for cement slurry compositions, according to one or more examples of the present disclosure.

FIG. 3 graphically illustrates the experimental results of Example 3. The bottom most line of graph in FIG. 3 shows CSD at BHST (140° F.) and BHP (6,000 psi) of a 11.0 ppg 50/50 Class C/Fly-ash system containing the following additives: 0.02 gps of antifoam; 10% BWOB of bentonite; 0.50% BWOB of sodium silicate; and 0.50% BWOB of lignosulfonate-type retarder. This is the reference slurry without any additive to boost CS. It was mixed as per API 10B-2 and conditioned for 30 minutes at BHCT (130° F.).

In Example 3, it is observed how the different concentration of metakaolin affects the CS development.
- The second bottom most line: Reference slurry+5% BWOB of metakaolin.
- The third bottom most line: Reference slurry+10% BWOB of metakaolin.
- The top line: Reference slurry+15% BWOB of metakaolin.

Example 4

Figure 4:
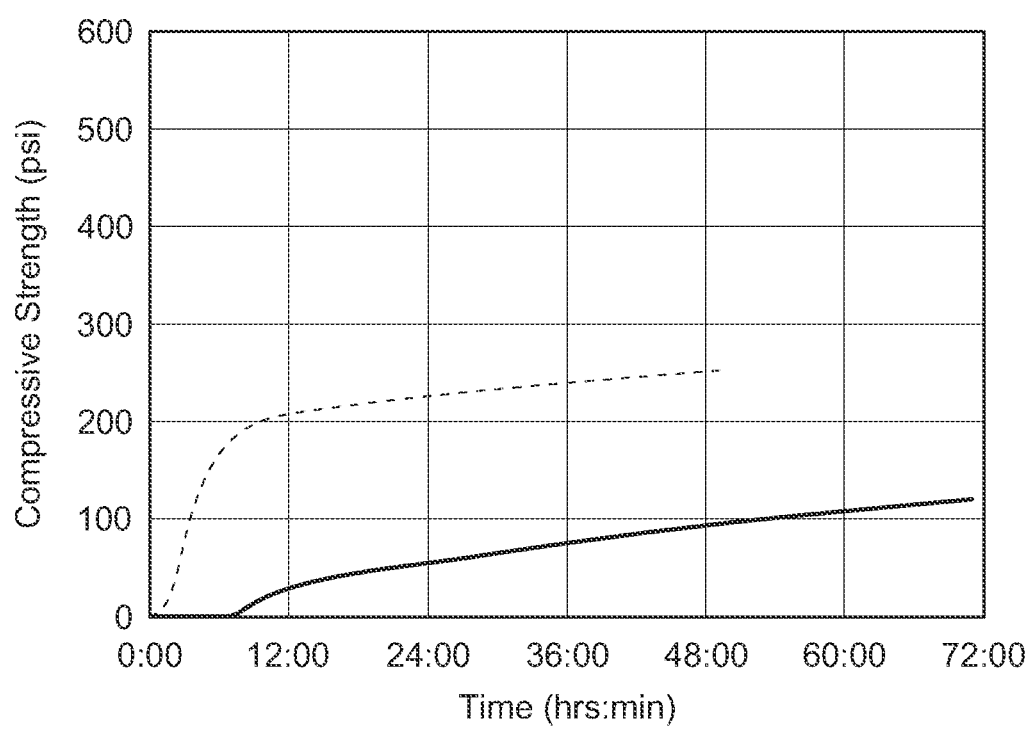
FIG. 4 is a graph showing CSD at a BHST of 140° F. and a BHP of 6,000 psi for cement slurry compositions.

FIG. 4 graphically illustrates the experimental results of Example 4. The bottom line of graph in FIG. 4 shows CSD at BHST (140° F.) and BHP (6,000 psi) of a 11.0 ppg 50/50

Class C/Fly-ash system containing the following additives: 0.02 gps of antifoam; 10% BWOB of bentonite; 0.50% BWOB of sodium silicate; and 0.50% BWOB of lignosulfonate-type retarder. This is the reference slurry without any additive to boost CS. It was mixed as per API 10B-2 and conditioned for 30 minutes at BHCT (130° F.).

The top line shows the CSD of a 11.0 ppg 50/50 Class C/Metakaolin with the same additives at the same concentration.

Example 4 shows how much metakaolin may improve CS in a one-by-one replacement of fly-ash.

Example 4 may not be an optimized solution for metakaolin. Its use at higher concentration may limit the potential of CS improvement and may significantly affects thickening time. Examples 1-3 show that in optimized or substantially optimized designs, metakaolin has the capability of boosting CS development above any other pozzolanic material and does not affect thickening time.

Example 5

Figure 5:
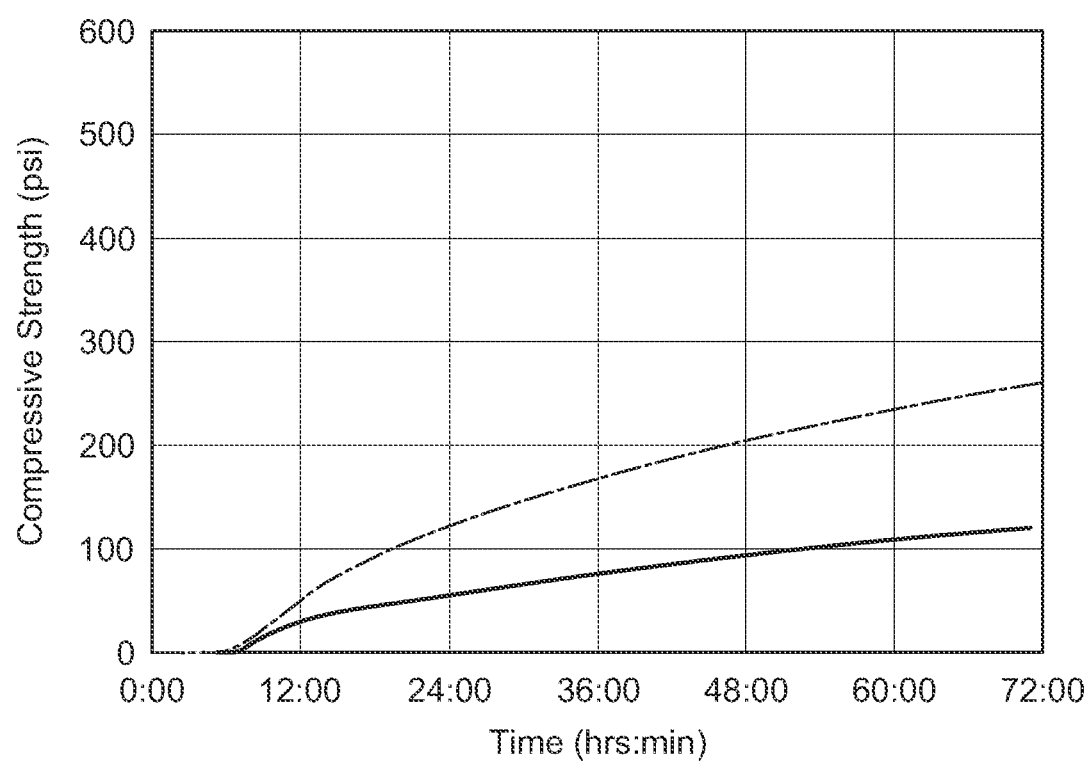
FIG. 5 is a graph showing CSD at a BHST of 140° F. and a BHP of 6,000 psi for cement slurry compositions.

FIG. 5 graphically illustrates the experimental results of Example 5. The bottom line of the graph in FIG. 5 shows CSD at BHST (140° F.) and BHP (6,000 psi) of a 11.0 ppg 50/50 Class C/Fly-ash system containing the following additives: 0.02 gps of antifoam; 10% BWOB of bentonite; 0.50% BWOB of sodium silicate; and 0.50% BWOB of lignosulfonate-type retarder. This is the reference slurry without any additive to boost CS. It was mixed as per API 10B-2 and conditioned for 30 minutes at BHCT (130° F.).

The top line shows the CSD of a 11.0 ppg system with the addition of 5% BWOB of metakaolin and 5% BWOB of rice husk ash.

FIG. 5 shows that inclusion of the first aluminosilicate additive (i.e., metakaolin), the optional second aluminosilicate additive (i.e., fly-ash), and the optional pozzolanic additive (i.e., rice husk ash) into the 11.0 ppg system achieves improved CS development when directly compared to the reference slurry excluding the metakaolin and rice husk ash. The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A pumpable cement slurry composition comprising:
   at least one cement component comprising cement particles;
   water;
   an aluminosilicate additive component consisting of:
      a first aluminosilicate additive comprising metakaolin and having an amorphous phase of greater than 50%; and
      a second aluminosilicate additive comprising rice husk ash,
   wherein the first and second aluminosilicate additives are each present at a concentration of about 10% to about 15% by weight of the at least one cement component and comprise a weight ratio of silica to aluminum oxide (Si/Al weight ratio) of about 1.0 to about 2.5, and
   wherein the pumpable cement slurry composition comprises a density of about 10 ppg to about 11.5 ppg and a solid volume fraction of less than about 40%.

2. The pumpable cement slurry composition of claim 1, wherein the amorphous phase of the first aluminosilicate additive is greater than or equal to about 90% and the weight ratio of silica to aluminum oxide of the first aluminosilicate additive is about 1.1 to about 2.3.

3. The pumpable cement slurry composition of claim 1, wherein the at least one cement component is Portland cement or ordinary Portland cement, construction cement, or a combination thereof.

4. The pumpable cement slurry composition of claim 1, wherein particle sizes of the first aluminosilicate additive and the second aluminosilicate additive are each less than particle sizes of the cement particles.

5. The pumpable cement slurry composition of claim 1, wherein a viscosity of the pumpable cement slurry composition is less than about 400 cP.

6. The pumpable cement slurry composition of claim 1, wherein the density of the pumpable cement slurry composition is about 10 ppg to about 11 ppg.

7. The pumpable cement slurry composition of claim 5, wherein the viscosity of the pumpable cement slurry composition is less than about 350 cP.

8. The pumpable cement slurry composition of claim 5, wherein the viscosity of the pumpable cement slurry composition is less than about 300 cP.

9. The pumpable cement slurry composition of claim 1, wherein the solid volume fraction of the pumpable cement slurry composition is less than about 35%.

10. The pumpable cement slurry composition of claim 9, wherein the solid volume fraction of the pumpable cement slurry composition is less than about 25%.

11. The pumpable cement slurry composition of claim 9, wherein the at least one cement component is Portland cement.

12. The pumpable cement slurry composition of claim 9, wherein the at least one cement component is ordinary Portland cement.

13. A method for cementing a subterranean well comprising of a borehole, the method comprising:
   preparing a pumpable cement slurry composition comprising:
      at least one cement component comprising cement particles;
      water present at a concentration of at least about 200% by weight of the cement component;
      an aluminosilicate additive component consisting of:
         a first aluminosilicate additive comprising metakaolin and having an amorphous phase of greater than about 50% and a silica to aluminum ratio (Si/Al ratio) of about 1.0 to about 2.5;
         a second aluminosilicate additive comprising rice husk ash; and
      at least one cement additive selected from one or more dispersants, at least one antifoam, one or more retarders, one or more accelerators, silica, or at least one combination thereof;

wherein the first and second aluminosilicate additives are each present at a concentration of about 10% to about 15% by weight of the at least one cement component and comprise a weight ratio of silica to aluminum oxide (Si/Al weight ratio) of about 1.0 to about 2.5, and wherein the pumpable cement slurry composition comprises a density of about 10 ppg to about 11.5 ppg and a solid volume fraction of less than about 40%;

pumping the pumpable cement slurry composition into the subterranean well such that the pumpable cement slurry composition is disposed at or in a zone of the subterranean well; and allowing the pumpable cement slurry composition to set and form a solid mass in the zone.

14. The method of claim 13, wherein the second aluminosilicate additive has a weight ratio of silica to aluminum oxide of about 1.7 to about 2.5.

15. The method of claim 14, wherein a viscosity of the pumpable cement slurry composition is less than about 400 cP.

* * * * *